United States Patent [19]
Land et al.

[11] 3,798,439
[45] Mar. 19, 1974

[54] ILLUMINATION AND OTHER DEVICES FOR USE WITH PHOTOGRAPHIC FILM PACK CONTAINER

[75] Inventors: Edwin H. Land, Cambridge; Albert J. Bachelder, Lexington, both of Mass.

[73] Assignee: Polaroid Corporation, Cambridge, Mass.

[22] Filed: July 16, 1973

[21] Appl. No.: 379,737

Related U.S. Application Data

[63] Continuation-in-part of Ser. No. 232,060, March 6, 1972.

[52] U.S. Cl. ............................... 240/10.65, 95/19
[51] Int. Cl. ............................................. F21l 7/00
[58] Field of Search........ 240/2 R, 2 C, 10.6, 10.65; 95/13, 19, 31 CA

[56] References Cited
UNITED STATES PATENTS

| | | | |
|---|---|---|---|
| 2,780,721 | 2/1957 | Lenning | 240/10.65 |
| 2,879,381 | 3/1959 | Colfey | 240/10.65 |
| 3,643,571 | 2/1972 | Erlichman et al. | 95/13 |

*Primary Examiner*—Joseph F. Peters, Jr.

[57] ABSTRACT

An illumination or other device adapted to be powered by a battery contained in a photographic film container or cassette from which the film has been removed. The illumination device disclosed is designed to be releasably engaged with and at least partially enclose a "used" photographic film container. It is particularly adapted for use as a flashlight and includes or provides for a lamp, reflector and switch, and is constructed to achieve compactness by locating at least the major portion of the lamp and reflector within a portion of the film container previously occupied by photographic film.

26 Claims, 7 Drawing Figures

PATENTED MAR 19 1974 3,798,439
SHEET 1 OF 3
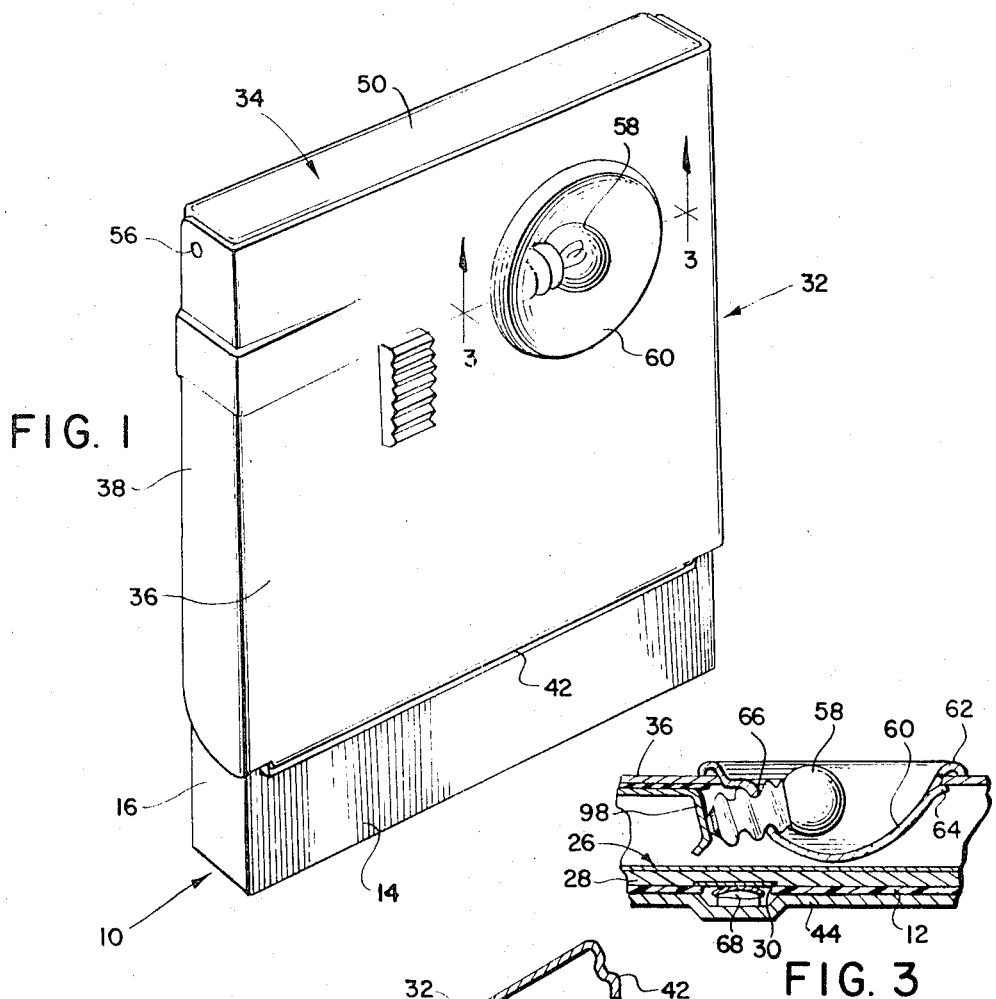
FIG. 1
FIG. 3
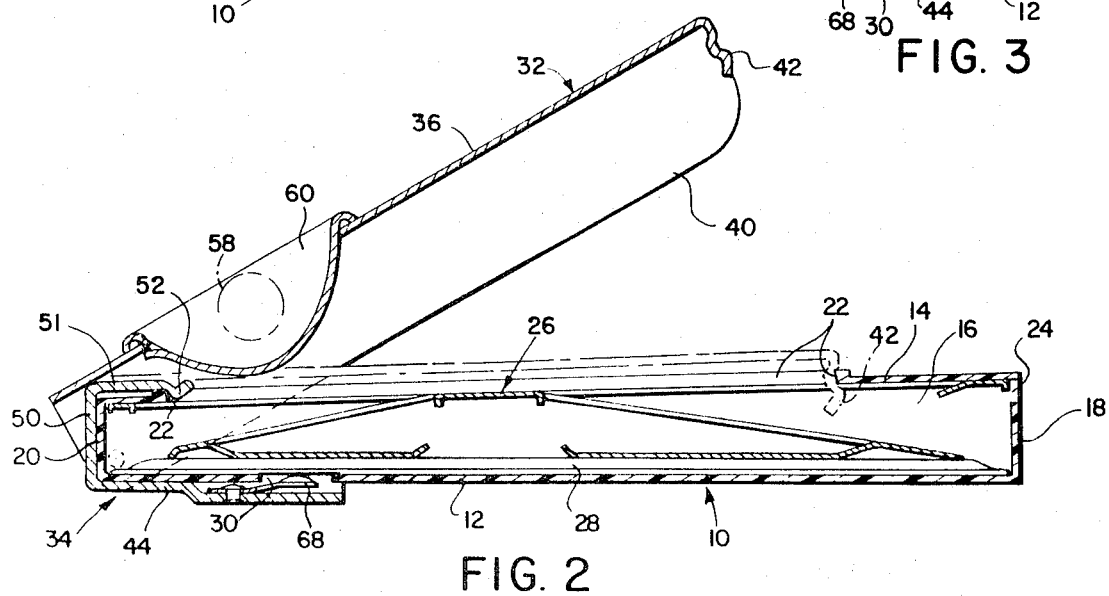
FIG. 2

ILLUMINATION AND OTHER DEVICES FOR USE WITH PHOTOGRAPHIC FILM PACK CONTAINER

This application is in part a continuation of application Ser. No. 232,060, filed Mar. 6, 1972 now abandoned.

BACKGROUND OF THE INVENTION

In U. S. Pat. Nos. 3,543,662, issued Dec. 1, 1970; 3,461,339, issued Feb. 9, 1971; 3,593,631, issued July 20, 1971; 3,651,746, issued Mar. 28, 1972; 3,705,542, issued Dec. 12, 1972; and 3,705,537, issued Dec. 12, 1972 there are shown and described photographic film assemblages each basically comprising a container or cassette and a multiplicity of photographic film units preferably of the self-developing type arranged in stacked relation and adapted to be exposed and then withdrawn from the container and processed. Film assemblages of this type, the film assemblage described in U.S. Pat. No. 3,543,662 being typical, also include a primary cell or battery for operating the components of the camera in which the film units are exposed and processed including, for example, the camera exposure system and the mechanism for processing the film units. Batteries incorporated in such film assemblages are required to have the substantial capacity needed to operate the camera and excess capacity sufficient to insure exposure and processing of all of the film units supplied in the film assemblage.

As a rule, the film pack container or cassette would be considered expendable and would be discarded following removal of the film units originally contained therein. However, while operation of the camera mechanism consumes the major portion of the battery capacity, e.g., 90 percent, it has been found that following completion of exposure and processing of all of the film units of a film pack, the battery therein still retains sufficient capacity to power a small electrical device, particularly a small electric lamp, such as employed in conventional flashlights, for an extended period of time, e.g., 24 hours.

An object of the invention is to utilize to advantage the residual electrical capacity of a photographic film pack battery after the film has been withdrawn from the pack.

This and other objects of the invention are achieved by providing an electrically energized device, particularly an illumination device such as a flashlight, adapted to be coupled with and powered by the partially expended battery remaining in the container of a photographic film pack from which the film has been removed and which otherwise would be discarded.

Another object of the invention is to provide an electrically energized device, particularly an illumination device of the type described that is inexpensive, easy and convenient to use, i.e., easily coupled with the film pack container, and cooperates with the pack container to form a compact structure that is only slightly larger than the container itself.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings.

FIG. 1 is a perspective view of a flashlight device incorporating the invention operatively coupled with a film pack container;

FIG. 2 is a sectional view through the flashlight device and film pack container illustrating the construction of the device and the container and the cooperation therebetween;

FIG. 3 is a sectional view taken substantially along the line 3—3 of FIG. 2;

Figure 4:
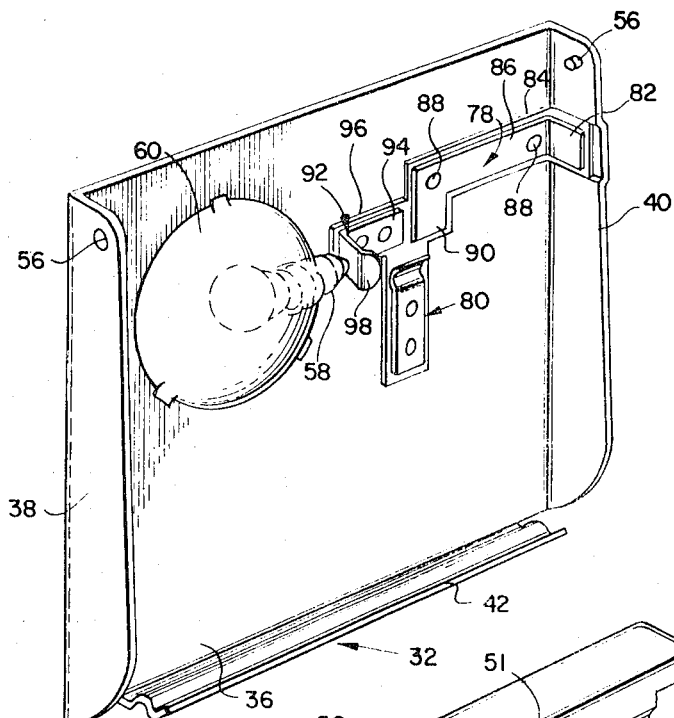
FIG. 4 is a rear perspective view of a section of the flashlight device.
Figure 5:
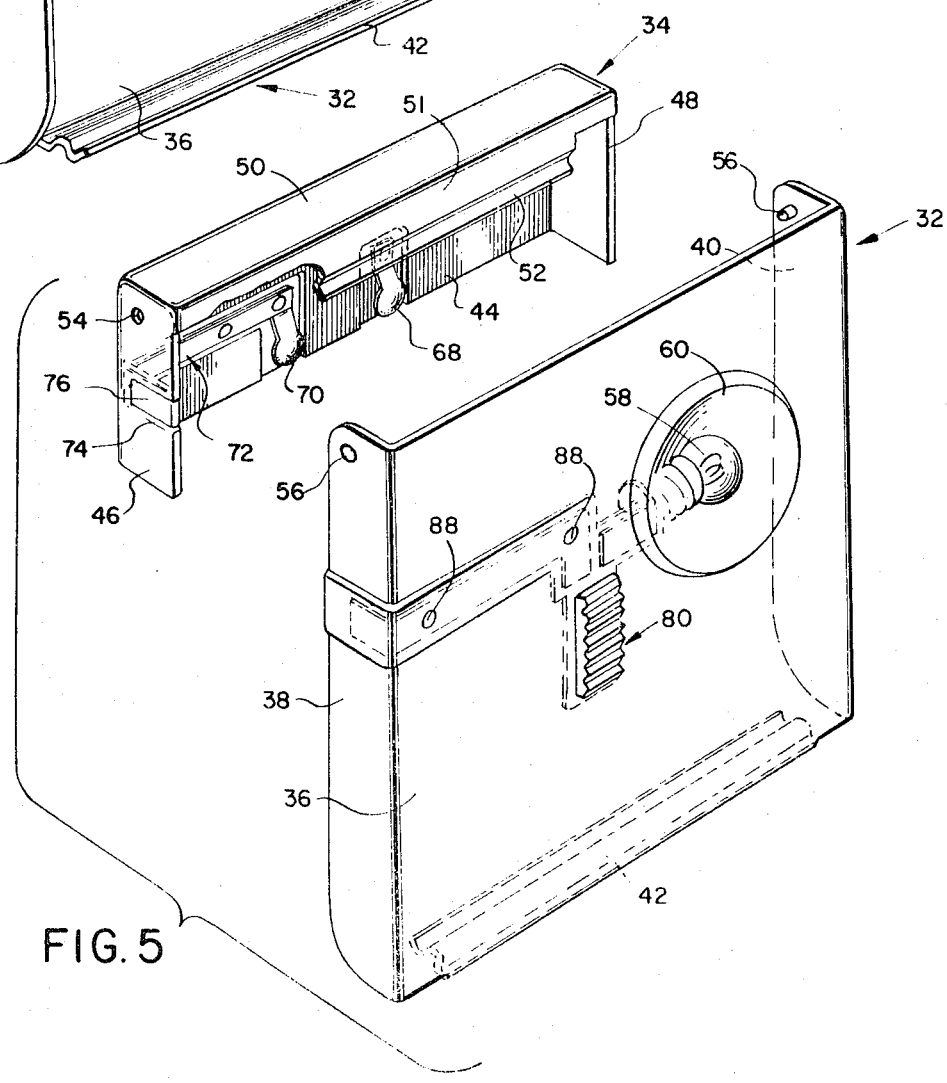
FIG. 5 is a view similar to FIG. 4 of another section of the device.

Reference is now made to FIGS. 1 through 3 wherein there is illustrated an electrically energized illumination device adapted to use as a conventional flashlight, coupled with a film pack container of the type disclosed in the aforementioned patents. The basic components of the film pack from which the film has been removed include a generally parallepiped-shaped container 10 having a rear wall 12, forward wall 14, side walls 16, a leading end wall 18 and a trailing end wall 20. The forward wall is formed with a generally rectangular exposure aperture 22 through which film units arranged in stacked relation in the container are exposed and a slot 24 near the intersection of end wall 20 and forward wall 14 through which the film units are moved from the container one at a time following exposure within the container. The expended film pack also includes a spring and pressure plate assembly 26 adapted to support the forwardmost film unit against forward wall 14 in position for exposure to light admitted through exposure aperture 22.

The pack also includes a relatively thin, rectangular battery or primary cell 28 mounted between the spring and pressure plate assembly 26 and rear wall 12 so that in one form of the film pack, e.g., shown in U. S. Pat. No. 3,543,662, sections of spring and pressure plate assembly 26 perform the additional function of supporting the battery in position against the rear wall of the film pack container. For additional details of the construction and arrangement of the container, pressure plate assembly and battery, reference may be had to any of the aforementioned U.S. patents.

In the form of film container shown in FIGS. 1 through 3, the battery terminals are substantially flush with the rear surface of the battery and are located in alignment with battery contact openings 30 in rear wall 12 providing access to the battery terminals by contacts within the camera or in the flashlight adapter of the invention. The battery terminals may be located against or mounted on any of the walls of the container which are constructed to provide access to suitably locate battery contacts within the camera. For example, in the aforementioned U. S. Pat. No. 3,651,746, the leading end wall 18 is constructed as a double wall and the battery contacts are sandwiched between inner and outer wall portions, the latter being provided with openings for contacts within the camera. Although the illumination device of the present invention is constructed for contacting the battery terminals through openings 30 in rear wall 12, it should be understood that other battery contact constructions and locations are possible depending upon the positioning of the battery terminals; and that such constructions are considered to fall within the scope of the present invention since the basic difference is in the location of the battery contacts rather than the inventive concepts embodied in the particular flashlight adapter structure.

Illumination devices embodying the present invention generally include a light source, battery contacts, conductive means connecting the battery contacts to the light source and body means adapted to be releasably coupled with the film pack container for enclosing and supporting the other components of the device. The illumination device may be adapted to perform a number of different functions aside from that already mentioned, namely, as a flashlight incorporating a reflector, either separately or as part of a lamp, for collecting and directing light. Alternatively, the device of the invention may be constructed to illuminate an area, function as a night light, warning light, or the like. In the particular construction shown in FIGS. 1 through 5 of the drawings, the device is designed to function as a flashlight and includes a concave reflector, a socket, holder or other means for supporting a replaceable lamp and making one electrical contact therewith, a conductor for making a second electrical contact with the lamp and a switch for controlling the flow of current from the battery through the lamp.

The device of the invention includes a body adapted to engage and partially enclose film container 10. The body, in the form shown in FIGS. 1 through 5, comprises a forward section designated 32 and a rear section 34 pivotally coupled with one another between the closed or operative position shown in FIG. 1 in which the body is operatively engaged around one end of the film container and an open position such as shown in FIG. 2 to permit insertion and withdrawal of the film container. As will be seen from the drawings, battery terminal openings 30 are located in rear wall 12 near the trailing end of the film pack and the body of the device is designed to enclose at least the trailing end of the film container and extend in covering relation across at least a portion of exposure aperture 22 in forward wall 14. If the illumination device were to be designed for use with a film pack container in which the battery contacts are located near the leading end or in the leading end wall, then the body would be adapted to encompass at least the leading, rather than trailing, end of the film container.

The body and/or reflector of the illumination device of the invention may be designed to be formed of a conductive material such as sheet metal or, alternatively, of a polymeric plastic material which may be electrically nonconductive and is adapted to fabrication by molding methods. Both basic types of structures, i.e., substantially all-metal and substantially all-plastic, are illustrated and described herein, the all-metal structure being shown in FIGS. 1 through 5.

The forward section of the body includes a generally rectangular forward wall 36 approximately equal in width to container 10 adapted to extend from the trailing end of forward wall 14 at least to the edge of aperture 22 closest the leading end of the container. Forward section 32 also includes side walls 38 and 40 dependent from forward wall 36 and a resilient detent 42 dependent from the transverse edge of forward wall 36 closest to the end of the device located near the leading end of the film container. Forward wall 36 is adapted to overlie exposure aperture 22 in forward wall 14 while side walls 38 extend exterior of the side walls 16 of the container in closely adjacent relation thereto when the illumination device is operatively engaged with the film container.

Rear body section 34 includes a relatively short rear wall 44 adapted to overlie battery terminal openings 30, dependent side walls 46 and 48, a transverse end wall 50, a relatively short rear forward wall 51 dependent from end wall 50 and a detent 52 extending from the transverse edge of forward wall 51 toward rear wall 34.

Side walls 46 and 48 are designed to fit between and closely adjacent side walls 38 and 40 and the four side walls are provided with aligned openings 54 for pivot means such as pivots 56 or the like, coupling the forward and rear body sections 32 and 34 for pivotal motion relative to one another.

To operatively couple the flashlight device to a film unit container, the forward and rear body sections are pivoted apart to an open or inoperative position similar to that shown in FIG. 2 and the trailing end of the film pack container is inserted between detent 52 and rear wall 44 with the rear wall 12 of the container located against rear wall 34 and detent 52 engaged with the transverse edge of exposure aperture 22 located closest the trailing end of the film unit. Forward body section 32 is then pivoted toward the rear body section so that detent 42 engages the leading transverse edge of exposure aperture 22 thus retaining the forward body section in the closed or operative position in which it extends across the exposure aperture in covering relation thereto.

The illumination device or flashlight adapter of the invention includes an illumination source shown as a conventional lamp 58 with a threaded base and a concave reflector 60. Reflector 60, in the form shown in detail in FIG. 3, is mounted in a generally circular opening in forward wall 36 and is designed to be inserted from the front having a rim 62 larger than the opening in the forward wall, and to be retained in place by indenting or lancing portions 64 of the reflector. Reflector 60 is provided with an opening 66 formed in such a way as to permit the threaded lamp base to be screwed into the opening where it is retained in place as shown in FIG. 3 with the axis of the lamp base located at an acute angle with respect to the forward and rear walls of the film pack container. This form of mounting of the lamp permits the use of a relatively large lamp having an axial dimension that exceeds the maximum depth of the space within the empty film pack container available to receive the lamp and reflector. The reflector shown in FIG. 3 is formed of conductive material thereby making one electrical contact with the threaded portion of the lamp base.

While the construction of the flashlight adapter illustrated in the drawings is designed to incorporate a conventional lamp and external reflector, it is merely intended to be illustrative and other forms of lamps and/or reflector combinations may be incorporated. For example, lamps are available including an internal reflector within the glass envelope which may also function as a lens. In many cases, such lamps may be of a size small enough such that the lamp with the internal reflector can be oriented so as to direct the light from the container while at least the major portion of the lamp itself is enclosed within the flashlight adapter housing. In alternative embodiments in which the illumination source is intended to illuminate an area rather than focus the light as a beam, a conventional lamp may be mounted such that the glass envelope containing the filament extends from the body of the adapter, e.g., with the lamp axis substantially perpendicular to forward wall 36 of the adapter. In this embodiment, a generally hemispherically-shaped light-transmitting cover may be provided over the lamp to protect it from damage and/or perform additional functions such as diffusing the light and/or providing a large light source. In such an embodiment, the cover may be clear, light-diffusing and/or colored, for example, to form a red warning light. Whereas only one particular type of lamp and reflector have been illustrated, the aforementioned and other variations of lamps, lamp covers, and reflectors as well as conductive mounts for both screw base and bayonet base lamps are well known in the art and can be employed as equivalents of the lamp reflector and lamp mounting shown.

The film pack illumination device shown in FIGS. 1 through 5, includes a body formed of conductive material, e.g., metal, designed for use with a film pack container formed of a polymeric material which is nonconductive, and the body of the adapter itself functions as one of the conductors for conducting electrical current from the battery terminals in the film pack container to the lamp. A pair of battery contacts designated 68 and 70, adapted to extend into openings 30 into conductive engagement with the battery contacts, are mounted on rear wall 44 of rear body section 34. Each of contacts 68 and 70 is formed of a resilient material and includes an end section biased forwardly for projecting into openings 30 in rear wall 12 of container 10. Contact 68 is mounted directly on rear wall 44 so as to be electrically coupled therewith and/or may be formed as an integral portion of wall 44 by lancing and bending a section of the wall itself so that current from contact 68 is conducted by way of body sections 32 and 34 and reflector 60 to the threaded portion of the lamp base screwed into the reflector.

Contact 70 is insulated from the rear body section 34 by a layer of insulating material secured between the contact and rear wall 44. In the form shown in FIG. 5, contact 70 may comprise an integral portion of an L-shaped conductive strip 72 extending along the inner surface of rear wall 44 from contact 70 toward side wall 46 and then forwardly within a slot 74 formed in side wall 46 of rear body section 34. The forwardly extending portion designated 76 of conductive strip 72 is designed to contact a second conductive strip in the forward body section 32 when the two sections are in the closed or operative position. Conventional means such as rivets or the like, insulated from either the body section or the conductive strip 72, preferably the latter, are employed for mounting the strip on the rear wall of the body section. In order to provide for a more compact structure, rear wall 44 may be recessed to accommodate contacts 68 and 70 and the insulating material between the rear wall and contact 70 and conductive strip 72, thereby providing for a minimum spacing between rear wall 44 and rear wall 12 of the film pack.

A second conductive strip 78 preferably formed of sheet metal is mounted on forward body section 32 and is designed to make contact with portion 76 of strip 72 for conducting current from the battery to a conventional manually operable switch generally designated 80. Second conductive strip 78 includes an end portion 82 seated in a recess in side wall 40 and insulated therefrom by a layer 84, a medial portion 86 secured to forward wall 36 by suitable means such as insulated rivets 88 and an end or contact portion 90, the medial and end portions being electrically insulated from the forward wall by insulating layer 84. End portion 82 is designed to contact portion 76 on the rear body sections when the latter are in their closed or operative position.

Switch 80 is designed to electrically couple conductive strip 78 with an L-shaped lamp contact 92 having a base portion 94 secured to forward wall 36 and insulated therefrom by a layer 96 and an upstanding contact portion 98 designed to make electrical contact with the end contact of a lamp base. Switch 80 is illustrated as the type adapted to be moved into bridging engagement with contact portion 90 of conductive strip 78 and base portion 94 of lamp contact 92. Other forms of switches may be employed and are considered to fall within the scope of the invention. Such a switching arrangement, similar to that shown in FIG. 6, might include the spaced overlapping of contact portion 90 and base portion 94 together with manually operable means for moving one of the overlapping portions, preferably contact portion 90, into contact with the other portion to complete the circuit to the lamp.

Figure 6:
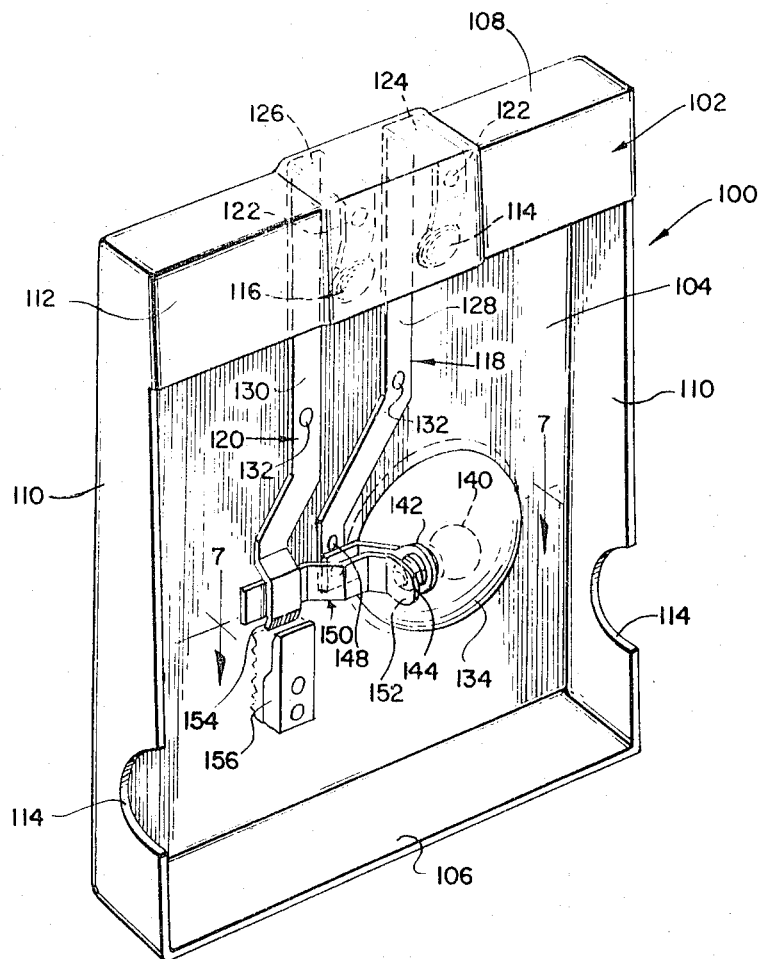
FIG. 6 is a perspective view illustrating another embodiment of a flashlight device.
Figure 7:
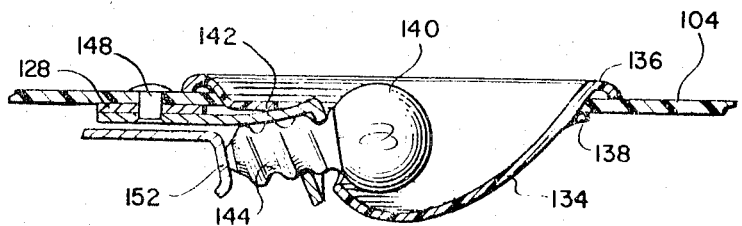
FIG. 7 is a sectional view taken substantially along the line 6—6 of FIG. 5.

As previously noted, the illumination device of the invention may have a number of different constructions and be formed of a number of different materials, particularly polymeric materials which are insulators. Another embodiment of the illumination device, designated 100, is illustrated in FIGS. 6 and 7, this embodiment being adapted to formation entirely of polymeric material except for the conductors and battery and lamp contacts and mount. Illumination device 100 includes a housing or body 102 adapted to be formed entirely of a synthetic plastic material which is an electrical nonconductor, preferably by a conventional molding process in which the entire body is formed as a unit in a single operation. The body 102 is in the form of a generally parallelepiped-shaped box similar in shape to the film pack container and slightly larger in order to encompass, at least partially, the six sides of the film container. Body 102 includes a forward wall 104 slightly larger than the forward wall of the film container, a dependent leading end wall 106, trailing end wall 108, side walls 110, and a short rear wall 112 located at the end of the body for encompassing the trailing end of a film pack container in which the battery terminals are located.

The body 102 of illumination device 100 is designed to permit the film pack container to be introduced, trailing end foremost, between forward and rear walls 104 and 112 into a position in which the film container is located between side walls 110 with end wall 106 located adjacent the leading end wall of the film container. The resilience of the materials of which both the film container and body 102 are formed provides for introduction, retention and withdrawal of the film container, the latter being facilitated by the provision of notches 114 in side walls 110 which permit the film container to be grasped for withdrawing it from housing 102.

The battery contacts comprise forwardly biased end portions 114 and 116 of, respectively, conductive strips 118 and 120 preferably formed of resilient sheet metal. Conductive strips 118 and 120 are secured to the inside (forward surface) of rear wall 112 by suitable means such as rivets 122 and end portions 114 and 116 which form the battery contacts and are biased forwardly and shaped to enter the battery terminal openings 30 in the rear wall of the film pack container. To facilitate introduction of the film pack container into housing 102, the end portions 114 and 116 may be dished or convexly curved so as to facilitate the deflection rearwardly during introduction of the film pack container. Additionally, rear wall 102 may be formed with rearwardly extending recesses to accommodate the deflected end portions 114 and 116 during introduction of the film pack container while permitting the remainder of the rear wall 112 to contact the rear wall of the film pack container and thereby aid in gripping and retention of the container within body 102.

Conductive strips 118 and 120 include, respectively, portions 124 and 126 disposed against end wall 108 in a recess formed therein, and, respectively, elongated portions 128 and 130 extending toward the lamp and reflector and secured to forward wall 104 in recesses formed therein by suitable means such as rivets 132.

A lamp reflector 134 is secured in an opening in forward wall 104 and may also be formed of a polymeric material, the reflecting surface being provided by a vacuum metallizing the concave surface of the reflector in a manner well known and familiar to the art. The reflector 134 is adapted to be introduced from the exterior of the forward wall and includes a rim 136 and detents 138 for retaining the reflector in place.

Conductive means are provided for mounting a threaded base type of lamp 140 and, in the form shown, comprise an angle bracket 142 formed with a generally circular lanced opening 144 into which the threaded base of the lamp may be screwed. Angle bracket 142 is located closely adjacent the inner or rear surface of reflector 134 and the latter is formed with an opening 146 aligned with opening 144 through which the threaded lamp base extends. Angle bracket 142 is electrically coupled with elongated portion 128 of conductive strip 118 and mounted on forward wall 104 by suitable means such as rivets 148.

A contact member 150 in the form of a strip of an electrically conductive material, i.e., sheet metal, is mounted on forward wall 104 and includes a rearwardly projecting end section 152 biased into contact with the end terminal of the lamp.

The illuminating device 100 includes a manually operable switch which, in the form shown in FIG. 6, comprises end section 154 of conductive strip 120 overlapping and spaced from an end section of contact member 150. A movable cam 156 adapted to a manually engageable switch member (not shown) on the exterior of the forward wall is provided for displacing end section 154 forwardly into contact with member 150 to complete the electric circuit between the batteries of the film pack container and the lamp.

The present invention is designed to encompass variations of the basic structures of the illumination device shown and adapted for use with a photographic film pack container and adapted to be powered by the battery incorporated therein. Such structural variations include the provision of a housing or body enclosing more or less of the film pack container and/or changes in conventional components of the structure. The latter include a variety of forms and types of lamps, reflectors, lamp contacts, switches, and the use in front of the lamp of lenses which can be merely protective or have special optical properties. The materials employed may be varied substantially as well as the arrangement and structure of the electrical conductors. In this latter regard, for example, flexible conductors or wires may be used to electrically couple the battery contacts to the switch and lamp contacts.

The invention is also intended to cover structures in which the film pack itself may be first subjected to a modification before it is coupled with the illumination device. For example, the leading end wall of the film pack, particularly when the latter is formed of a polymeric material, may be readily removed and the illumination device is designed such that the major portion thereof including the lamp can be introduced into the film pack through the opening provided by removal of the leading end wall. Alternatively, the device may be designed to at least partially encompass the film pack while the lamp, reflector, and/or lens may be designed to direct the light from within the film pack container through the opening provided by removal of the leading end wall.

Other features may be altered including, for example, the location of the lamp, reflector, and/or lens and the type and location of the switch which may be the same or similar to conventional switches employed in flashlights providing for on, off and pressure-actuated blinker operation positions.

It will be seen that the invention achieves its objects in providing a versatile illumination device which can be formed simply and inexpensively and is designed to utilize a source of electrical current which otherwise would be discarded along with its remaining utility. Another advantage of the illumination device is that it discourages the casual discarding of the film pack container following consumption of the film originally supplied therein, thus reducing the likelihood that such film containers will come to represent another form of litter.

While the invention has been described in terms of an illumination device as the preferred embodiment, it will be understood that other electrically energized devices, such as a toy or portable radio, may be similarly designed to receive and be powered by the battery in the otherwise expendable empty film container or cassette. In the preferred embodiments of the invention, at least some component of the electrically powered device, such as the lamp and reflector of a flashlight or the speaker of a radio, is disposed within a portion of the film container previously occupied by photographic film. It will be further understood that where greater electrical power is required, two or more empty film containers may be utilized with the batteries contained therein connected in series.

Since certain changes may be made in the above apparatus without departing from the scope of the invention herein involved, it is intended that all matter contained in the above description and shown in the accompanying drawings shall be interpreted as illustrative and not in a limiting sense.

We claim:

1. An illumination device for use with a photographic film container containing a battery, said illumination device being adapted to be powered by said battery and comprising, in combination:
   body means for releasably engaging a photographic film container from which the film has been removed;
   an electrically energized light source mounted on said body means;
   contact means mounted on said body means for making electrical contact with the terminals of a battery contained within a photographic film container operatively engaged by said body means; and
   conductive means for conducting electric current from said contact means to said light source.

2. An illumination device as defined in claim 1 wherein said conductive means include a manually operable switch for controlling the flow of current to said light source from a battery of a photographic film container operatively engaged by said body means.

3. An illumination device as defined in claim 1 wherein said light source is so mounted on said body means as to be at least partially disposed within a portion of a photographic film container previously occupied by photographic film when said body means are operatively engaged with the film container.

4. An illumination device as defined in claim 1 wherein said light source includes a lamp and reflector, at least the major portions of which are disposed within that portion of a photographic film container previously occupied by photographic film when said body means are operatively engaged with the film container.

5. An illumination device as defined in claim 4 wherein said conductive means include a manually operable switch for controlling the flow of current to said lamp from the battery of a photographic film container operatively engaged by said body means.

6. An illumination device as defined in claim 1 adapted for use with a relatively thin, generally parallelepiped-shaped photographic film container having a forward wall with an aperture through which film units are exposed, a rear wall against which a battery is supported and terminal openings in a wall of the container providing access to the terminals of the battery, wherein said contact means include contact members resiliently biased so as to extend into the terminal openings into contact with the battery terminals of a film container operatively engaged by said body means.

7. An illumination device as defined in claim 6 for use with a film container having terminal openings in the rear wall thereof and wherein said light source is mounted on said body so as to extend rearwardly into a film container through the exposure aperture thereof into space previously occupied by photographic film and said contact means are biased forwardly so as to extend into the terminal openings in the rear wall of a film container, operatively engaged by said body means, into contact with the terminals of the battery within the film container.

8. An illuminating device as defined in claim 7 wherein said light source includes a lamp and reflector so mounted on said body means that at least the major portions of said lamp and reflector are disposed within a portion of a photographic film container previously occupied by photographic film when said body means are operatively engaged with the film container, and said conductive means include a manually operable switch for controlling the flow of current to said lamp from the battery of a photographic film container operatively engaged by said body means.

9. An illumination device as defined in claim 6 wherein said body means include sections for overlying the battery terminal openings and at least a part of the exposure opening of a photographic film container operatively engaged by said body means.

10. An illumination device as defined in claim 9 wherein said light source is mounted on a section of said body means adapted to overlie the exposure opening of a photographic film container with which said body means are operatively engaged, to position at least the major portion of said light source within the portion of a film container previously occupied by photographic film.

11. An illumination device as defined in claim 10 wherein said light source includes a lamp and reflector for directing light from said lamp toward the exterior of a photographic film container operatively engaged by said body means.

12. An illumination device as defined in claim 10 adapted for use with a film container including terminal openings in the rear wall thereof and wherein said contact means are supported on said section of said body means overlying the rear wall of a film container operatively engaged by said body means.

13. An illumination device as defined in claim 12 wherein said conductive means include a manually operable switch for controlling the flow of current to said lamp from the battery of a photographic film container operatively engaged by said body means.

14. An illumination device as defined in claim 10 wherein said sections of said body means are moveable relative to one another into and from operative engagement with a photographic film container.

15. An illumination device as defined in claim 14 wherein said light source is mounted on one of said sections of said body means and said contact means are mounted on the other of said sections.

16. An illumination device as defined in claim 15 wherein said conductive means include at least one conductor mounted on said one section and coupled with said light source and a second conductor mounted on said other section coupled with one of said contact members, said conductors being positioned to make electrical contact with one another when said sections are in operative engagement with a photographic film container.

17. An illumination device as defined in claim 14 wherein one of said sections of said body means is constructed to completely overlie the exposure aperture of a photographic film container operatively engaged thereby.

18. An illumination device as defined in claim 17 wherein said light source is mounted on said one section of said body means such that the major portion of said light source is located within a portion of a film container previously occupied by photographic film when the film container is operatively engaged by said body means.

19. An illumination device as defined in claim 18 wherein said light source includes a lamp and reflector for directing light from the lamp toward the exterior of a photographic film container operatively engaged by said body means.

20. An electrically powered device for use with a photographic film container containing a battery, said device being adapted to be powered by said battery and comprising, in combination:
    body means for releasably engaging a photographic film container from which the film has been removed;
    an electrically energized means mounted on said body means;
    contact means mounted on said body means for making electrical contact with the terminals of a battery contained within a photographic film container operatively engaged by said body means;
    conductive means for conducting electric current from said contact means to said electrically energized means; and
    a portion of said electrically energized means so mounted on said body means as to be at least partially disposed within a portion of the photographic film container previously occupied by photographic film when said body means are operatively engaged with the film container.

21. A device as defined in claim 20 wherein said conductive means include a manually operable switch for controlling the flow of current from the battery of a photographic film container operatively engaged by said body means.

22. A device as defined in claim 20 adapted for use with a relatively thin, generally parallelepiped-shaped photographic film container having a forward wall with an aperture through which film units are exposed, a rear wall against which a battery is supported and terminal openings in a wall of the container providing access to the terminals of the battery, wherein said contact means include contact members resiliently biased so as to extend into the terminal openings into contact with the battery terminals of a film container operatively engaged by said body means.

23. A device as defined in claim 22 wherein said body means include sections for overlying the battery terminal openings and at least a part of the exposure opening of a photographic film container operatively engaged by said body means.

24. A device as defined in claim 20 wherein said body means includes sections moveable relative to one another into and from operative engagement with a photographic film container.

25. A device as defined in claim 24 wherein said electrically energized means is mounted on one of said sections of said body means and said contact means are mounted on the other of said sections.

26. A device as defined in claim 20 wherein one of said sections of said body means is constructed to completely overlie the exposure aperture of a photographic film container operatively engaged thereby.

* * * * *